United States Patent [19]

Fancy

[11] 4,133,578
[45] Jan. 9, 1979

[54] SEAT BACK ADJUSTING MECHANISM
[75] Inventor: Richard E. Fancy, Rochester, Mich.
[73] Assignee: General Motors Corporation, Detroit, Mich.
[21] Appl. No.: 853,109
[22] Filed: Nov. 21, 1977
[51] Int. Cl.² .......................... A47C 1/025; B60N 1/06
[52] U.S. Cl. ...................................... 297/370; 297/379
[58] Field of Search .......................... 297/373, 366–371, 297/363–365, 355, 379

[56] References Cited
U.S. PATENT DOCUMENTS

| 3,309,139 | 3/1967 | Turner et al. | 297/367 |
| 3,479,088 | 11/1969 | Bonnaud | 297/373 |
| 3,511,534 | 5/1970 | Turner | 297/373 |
| 3,663,056 | 5/1972 | Turner | 297/369 |
| 3,788,698 | 1/1974 | Perkins | 297/373 |

Primary Examiner—Roy D. Frazier
Assistant Examiner—William E. Lyddane
Attorney, Agent, or Firm—K. H. MacLean, Jr.

[57] ABSTRACT

A vehicle seat back support and, more particularly, a seat back support with provision for selective adjustment of the angular position between the seat cushion and the seat back. A seat cushion mounting member has a toothed sector in its upper, rearward edge portion. Below the toothed sector, a rotatable support shaft is mounted which includes an eccentric portion on which a seat back mounting member is pivotally mounted. The seat back mounting member includes a toothed portion adapted to engage or mesh with the toothed sector of the seat cushion mounting member. An actuation lever is attached to the rotatable support shaft to move the eccentric portion upward by rotation of the shaft. Resultantly, the seat back mounting member is moved upward and its toothed portion is disengaged from the toothed sector, thereafter permitting the seat back to be angularly adjusted with respect to the seat cushion.

1 Claim, 4 Drawing Figures

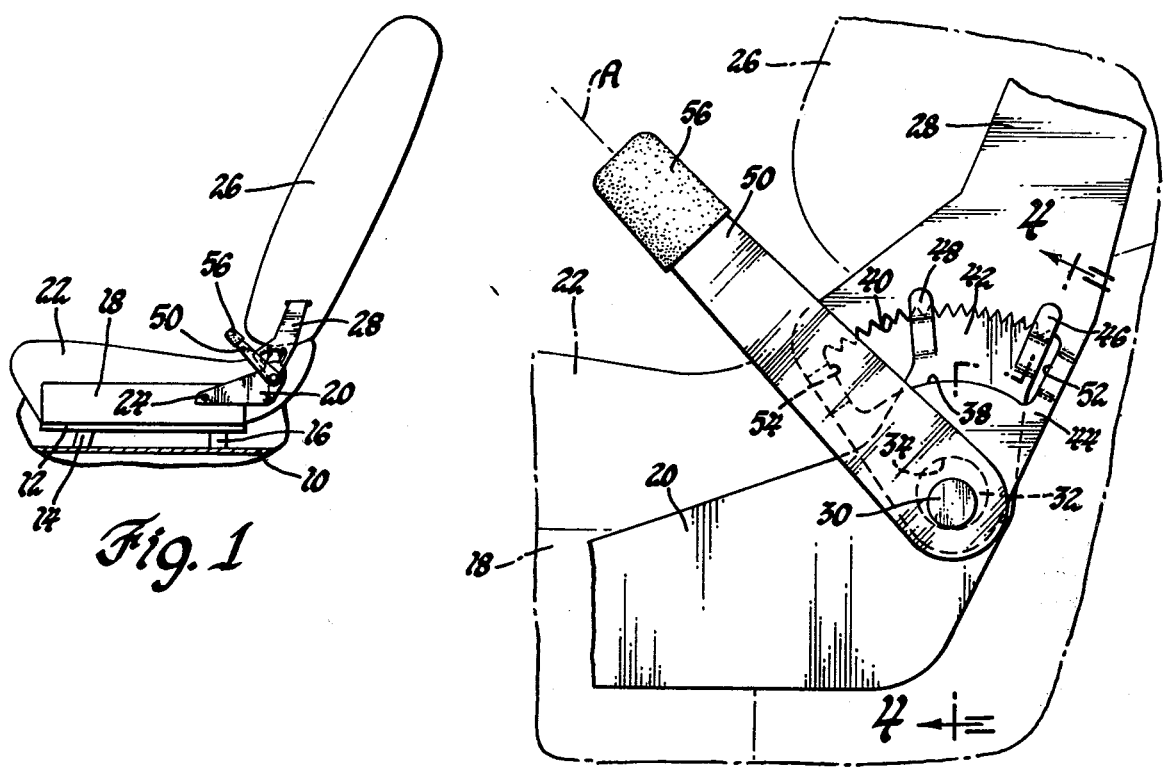
Fig. 1
Fig. 2
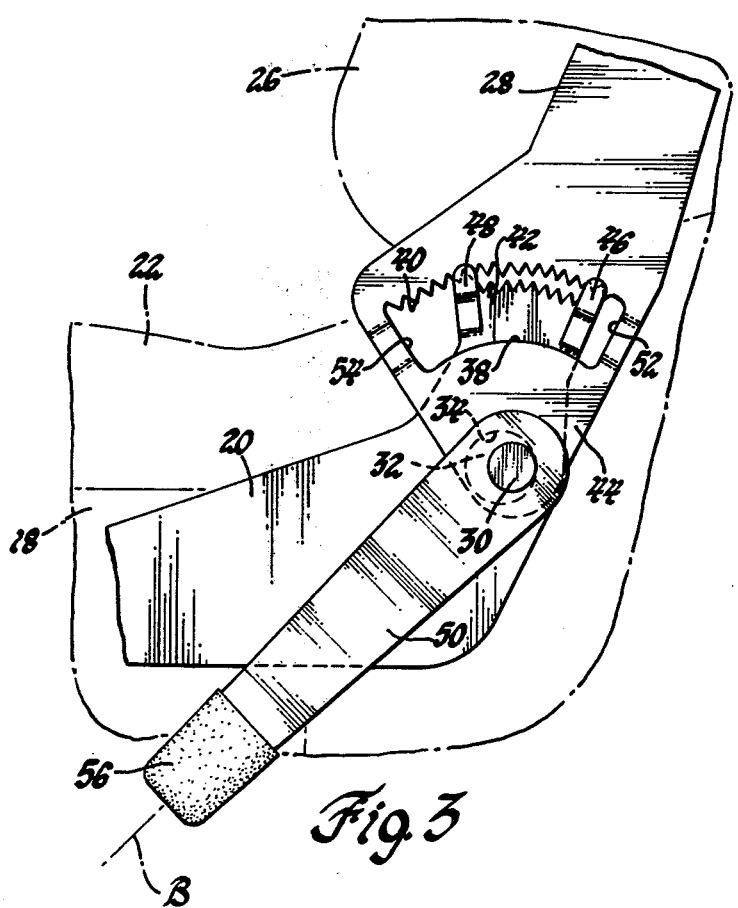
Fig. 3
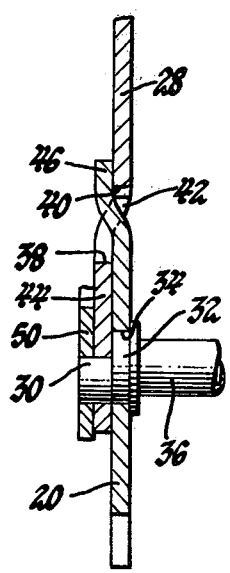
Fig. 4

SEAT BACK ADJUSTING MECHANISM

This invention relates to seat back supports and, particularly, to a seat back support which provides means for selective angular adjustment between a seat cushion portion and a seat back portion.

The subject adjustable seat back support is simple and lightweight. It exhibits a smooth operation and may be made of relatively few and lightweight, thin members for ease of manufacture. Prior adjustable seat back supports have utilized relatively complicated mechanisms which involve a more or less compact arrangement. An example of a prior art device is disclosed in U.S. Pat. No. 3,788,698 to Perkins. The particular seat back adjuster disclosed provides the seat back pivotal about a fastener. A toothed sector is formed on the end of the seat back mounting member adjacent the fastener. A locking member has teeth formed thereon and is supported separately by a fastener which has an axis offset from the axis of the first fastener for the seat back support. An eccentric portion moves the separate locking member out of engagement with the seat back mounting member, thereby permitting angular adjustment of the seat back.

The arrangement of the Perkins device is such that there are two primary axes provided for the seat back support member and for the locking member. Because of this, it is necessary that the locking member be located substantially below the axis of the seat back mount or fastener. Consequently, the seat back must pivot about an axis located relatively upward from the seat cushion. This can be undesirable since it is normally better to pivot the seat back forward so as to provide maximum foot room for entry of a passenger to the rear compartment of a vehicle. By providing a relatively high axis of rotation for the seat back, the seat may interfere more than is necessary. Further, separate attachment of the seat back mounting member and the locking member provides a less compact and more complicated device with need for a multiplicity of parts. Resultantly, tolerance problems associated with a seat back adjusting mechanism are likely to be more serious.

In contrast, the subject seat back adjuster provides a common pivotal support, both for the seat back and for actuating means permitting selective adjustment in the angular relation of the seat back to the seat cushion. This adjustment is provided by the meshing interaction between a toothed sector on the seat cushion mounting member and a toothed portion on the seat back mounting member. The toothed portions mesh at a location above the support axis. The actual support of the seat back mounting member is on an eccentric portion of a rotatable actuator so that when the actuator is pivoted, the toothed portions move away from each other. Resultantly, the seat back is free for adjustable movement with respect to the seat cushion.

Therefore, an object of the present invention is to provide a simple, compact and easy-to-manufacture seat back support and adjustment mechanism in which the pivot for the seat back and the adjusting mechanism are common.

A still further object of the present invention is to provide a seat back adjusting mechanism in which a seat back mounting member is supported on an eccentric portion of a rotatable actuator so that in response to rotation of the actuator, the eccentric moves from a position-establishing orientation to an adjustment orientation characterized by movement of the seat back mounting member from the seat cushion mounting member.

Still further objects and advantages of the present invention will be more readily apparent from an examination of the following detailed description, reference being had to the accompanying drawings in which a preferred embodiment is illustrated.

IN THE DRAWINGS

FIG. 1 is a side elevational view of a portion of the vehicle floor and a vehicle seat assembly thereabove with a view of the subject seat back adjusting mechanism;

FIG. 2 is an enlarged and fragmentary elevational view of the seat back adjusting mechanism in a use orientation or mode of operation;

FIG. 3 is a view similar to FIG. 2 but showing the seat back adjusting mechanism in an adjustment orientation or mode of operation;

FIG. 4 is a sectioned view taken along section line 4—4 in FIG. 2 and looking in the direction of the arrows.

In FIG. 1, a portion of a vehicle floor 10 is shown and a seat track support mechanism 12 is attached thereto by brackets 14 and 16. The seat track 12 is operably attached to a seat cushion mounting member 18 which includes a bracket means 20. The mounting member 18 supports a seat cushion 22 and is movable therewith as guided by track 12, thus providing a fore and aft adjustment of the seat cushion. The seat cushion bracket means 20 is attached to member 18 by means of a fastener 24, thus permitting bracket means 20 to pivot counterclockwise from its rest position in FIG. 1, about the axis of fastener 24. This pivotal arrangement is used to increase the access to the rear passenger compartment by the seat back 26.

As shown in FIG. 2, the seat back 26 is supported generally by the seat cushion mounting member 18 and, more specifically, the bracket means 20. A seat back mounting member 28 is attached to the seat back itself at an upper end portion. The lower end of the mounting member 28 extends below the bottom of seat back 26 and member 28 is pivotally mounted about an eccentric portion 30, which is a part of a rotatable shaft member 32. The member 32 is supported for rotation within an aperture or bore 34 in the seat cushion mounting means or member 20, as is best shown in FIG. 4. The rotatable member 32 includes a tubular cross member portion 36 extending to the opposite side of the seat. At the opposite side, a similar mechanism is mounted for adjustable support of an opposite seat cushion mounting member. Both mechanisms are operative simultaneously by this means.

Referring back to FIG. 2, the support of the lower end of the seat back mounting member on the eccentric portion 30 is illustrated. A semi-circular or arcuate slotted opening 38 is formed in member 28 at a location above the axis of the eccentric 30 and member 32. The upper edge thereof has a plurality of tooth-like configurations 40. Likewise, the seat cushion support means 20 provides a similarly toothed sector portion 42. The toothed sector is adapted to engage the toothed portions 40 of the member 28 over a range of angular positions between seat back 26 and cushion 22. In FIG. 2, the relationship between members 20 and 28 represents a use orientation or position whereby the seat back 26 is maintained at a preselective angular relationship with the seat cushion 22 by the interaction between the teeth on member 28 and the teeth on member 20. As can be seen in FIG. 4, member 28 has an offset contour at its lower end portion 44 adapted to overlie the member 20 and accept the eccentric portion 30. Resultantly, the portion of member 28, including the toothed portions 40, are in planar relationship with member 20 and its toothed sector 42. The members 20 and 28 and particularly the toothed portions thereon are held in planar relationship by struckout tab portions 46, 48 from the plane of member 20. The tab portions 46, 48 overlie the outboard surface of member 28 and prevent leftward movement of member 28 as viewed in FIG. 4. It should be noted again that on the opposite side of the seat assembly, there is a similar interaction between toothed portions of a seat cushion mounting member and on a seat back mounting member. Likewise, on the opposite side, tab portions are provided, thereby rigidly maintaining both seat back mounting members in planar relationship with both seat cushion mounting members.

When it is desired to change the angular relationship between the seat cushion 22 and seat back 26, the operator simply engages and pivots an actuator lever 50 which is attached to the rotatable member 32. Rotation of member 50 between the position A to the position B shown in FIG. 3 causes upward movement of eccentric 32. This bodily moves the seat back mounting member 28 upward as shown in FIGS. 2 and 3 and thereby disengages the toothed portions 40 on member 28 from the toothed sector 42 on member 20. The slight movement upward of member 28 is not sufficient to disengage the overlying relationship between tabs 46, 48 with the surface of member 28. While the member 28 is in the upward position shown in FIG. 3, the seat back 26 can be pivoted about the axis of the eccentric 30 within a range established by interference between the tabs 46, 48 and the ends 52, 54 of the slotted opening 38. Once a desired angular relationship is selected, rotation of lever 50 back to the position A of FIG. 2 will re-engage the toothed portions 40 with the toothed sector 42 to maintain the seat back in the desired position. It should be noted that actuating member 50 may be spring biased in a conventional manner so as to automatically return member 50 to position A after a manual disengaging force is ended. Also, the member 50 may have a molded handle portion 56 on its end, thereby making manipulation of the actuator 50 more convenient and pleasing to an operator of the vehicle.

Although one embodiment of the subject invention has been illustrated and described in detail, various modifications may be made thereto without falling outside the scope of the following claims which define the invention.

What is claimed is as follows:

1. A simple and compact mechanism for supporting a seat back in various angular position on a seat cushion, comprising: a substantially planar seat back mounting member adapted to be attached to the seat back; a seat cushiom mounting member adapted to be attached to the seat cushion and with a rearward end portion having an upwardly directed toothed sector thereon; said rearward end portion also having a uniformly circular aperture therein located below the toothed sector; a circular shaft extending through said aperture and dimensioned sufficient to permit rotation therein without body shifting movement; said shaft having an integral cylindrical end portion with its axis offset from the remainder of the shaft, thus forming an eccentric portion thereon; said seat back mounting member having a bore formed therein at the lower end for encircling the integral eccentric end portion; said seat back mounting member further having an elongated opening formed therein above said bore and with an arcuate upper edge configured with a continuously toothed profile for engagement with said upwardly directed toothed sector; the lower end portion of the seat back mounting member which houses said bore being offset from the plane of the toothed portion thereof to simultaneously allow alignment of said toothed portions of the seat back and cushion mounting members as well as the lower end and the eccentric portion of said shaft; an operating lever means attached at one end to said integral eccentric portion with the other end accessible for manual manipulation to rotate the shaft in an unlatching movement whereby the integral eccentric portion thereon is moved upward thus raising said seat back mounting member to disengage said toothed portions to permit subsequent angular adjustments therebetween.

* * * * *